United States Patent
Tomofuji

(10) Patent No.: US 12,019,926 B2
(45) Date of Patent: Jun. 25, 2024

(54) INFORMATION PROCESSING APPARATUS AND NOTIFICATION METHOD CAPABLE OF SUPPRESSING INCREASE IN NUMBER OF ACTIVATIONS OF STORAGE PORTION

(71) Applicant: KYOCERA Document Solutions Inc., Osaka (JP)

(72) Inventor: Shinji Tomofuji, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 18/358,652

(22) Filed: Jul. 25, 2023

(65) Prior Publication Data
US 2024/0036782 A1 Feb. 1, 2024

(30) Foreign Application Priority Data
Jul. 26, 2022 (JP) .................................. 2022-118362

(51) Int. Cl.
*G06F 3/12* (2006.01)
(52) U.S. Cl.
CPC ............ *G06F 3/122* (2013.01); *G06F 3/1221* (2013.01); *G06F 3/1229* (2013.01)
(58) Field of Classification Search
CPC ........... H04N 1/00885; H04N 1/00888; H04N 1/00896; H04N 1/32502; H04N 1/32507; H04N 1/32523; H04N 2201/0081; H04N 2201/0082; G06F 3/122; G06F 3/1221; G06F 3/1229
USPC ....................................................... 358/1.14
See application file for complete search history.

(56) References Cited

U.S. PATENT DOCUMENTS

| 5,978,099 A * | 11/1999 | Ema .................... | H04N 1/00206 358/442 |
| 8,982,380 B2 * | 3/2015 | Tomofuji ........... | H04N 1/00896 358/1.14 |
| 9,385,788 B2 * | 7/2016 | Akazawa ................ | H02J 50/12 |
| 2002/0010854 A1 * | 1/2002 | Ogura ................ | H04N 1/00888 713/100 |
| 2008/0229124 A1 * | 9/2008 | Kubo ........................ | H02J 1/14 713/300 |

(Continued)

FOREIGN PATENT DOCUMENTS

JP 2004157961 A 6/2004

*Primary Examiner* — Negussie Worku
(74) *Attorney, Agent, or Firm* — Alleman Hall & Tuttle LLP

(57) ABSTRACT

An information processing apparatus includes a power supply control portion, and a notification processing portion. The power supply control portion executes power supply control that includes: a first step of supplying power to a non-volatile storage portion in a case where an access request to access the storage portion is received while power supply to the storage portion is stopped; and a second step of stopping power supply to the storage portion after an access process of accessing the storage portion in response to the access request is completed. The notification processing portion notifies of a transmission source of access requests with the highest number of transmissions of the access requests received while power supply to the storage portion is stopped among the transmission sources of access requests when the number of executions of the power supply control exceeds a predetermined reference number of times.

7 Claims, 5 Drawing Sheets

(56) References Cited

U.S. PATENT DOCUMENTS

| | | | |
|---|---|---|---|
| 2009/0006874 A1* | 1/2009 | Fujiwara | G06F 1/266 713/310 |
| 2013/0057883 A1* | 3/2013 | Ohshima | H04L 12/12 358/1.9 |
| 2014/0317424 A1* | 10/2014 | Akazawa | H02J 50/80 307/104 |
| 2015/0109635 A1* | 4/2015 | Takatani | G06F 3/1221 358/1.14 |
| 2016/0105581 A1* | 4/2016 | Hikichi | H04N 1/32741 358/1.14 |
| 2016/0255246 A1* | 9/2016 | Chang | H04N 1/64 358/2.1 |
| 2018/0210539 A1* | 7/2018 | Hashimoto | G06F 1/3221 |
| 2019/0052764 A1* | 2/2019 | Hara | H04N 1/00933 |
| 2019/0364167 A1* | 11/2019 | Toyoda | H04N 1/00891 |

\* cited by examiner

FIG.3

| TRANSMISSION SOURCE MAC ADDRESS | NO. OF TRANSMISSIONS | | | | |
|---|---|---|---|---|---|
| | FIRST MONTH | SECOND MONTH | ... | SIXTH MONTH | TOTAL |
| ○○:○○:○○:::** | 680 | 567 | ... | 12545 | 17503 |
| △△:△△:△△:::** | 305 | 348 | ... | 320 | 1854 |
| □□:□□:□□:::** | 102 | 201 | ... | 153 | 1042 |
| ◇◇:◇◇:◇◇:::** | 94 | 78 | ... | 83 | 510 |
| ⋮ | ⋮ | ⋮ | ⋮ | ⋮ | ⋮ |
| TOTAL | 1017 | 2053 | ... | 13284 | 26439 |

INFORMATION PROCESSING APPARATUS AND NOTIFICATION METHOD CAPABLE OF SUPPRESSING INCREASE IN NUMBER OF ACTIVATIONS OF STORAGE PORTION

INCORPORATION BY REFERENCE

This application is based upon and claims the benefit of priority from the corresponding Japanese Patent Application No. 2022-118362 filed on Jul. 26, 2022, the entire contents of which are incorporated herein by reference.

BACKGROUND

The present disclosure relates to an information processing apparatus and a notification method.

An information processing apparatus such as a multifunction peripheral having a non-volatile storage portion such as a hard disk drive (HDD) is known. In addition, in order to reduce power consumption, an information processing apparatus is known that stops supplying power to the storage portion in a case where reading data from and writing data to the storage portion is finished. In this information processing apparatus, the storage portion is activated each time an access request to access the storage portion is received.

SUMMARY

An information processing apparatus according to one aspect of the present disclosure includes a power supply control portion, a count processing portion, and a notification processing portion. The power supply control portion executes power supply control that includes: a first step of supplying power to a non-volatile storage portion in a case where an access request to access the storage portion is received while power supply to the storage portion is stopped; and a second step of stopping power supply to the storage portion after an access process of accessing the storage portion in response to the access request is completed. The count processing portion counts a number of transmissions of the access requests received while power supply to the storage portion is stopped for each transmission source of the access requests. The notification processing portion notifies of a transmission source with a highest count number counted by the count processing portion among transmission sources of the access requests when a number of times the power supply control is executed exceeds a predetermined reference number of times.

A notification method according to another aspect of the present disclosure includes a power supply control step, a counting step, and a notification step. In the power supply control step, power supply control is executed that includes: a first step of supplying power to a non-volatile storage portion in a case where an access request to access the storage portion is received while power supply to the storage portion is stopped; and a second step of stopping power supply to the storage portion after an access process of accessing the storage portion in response to the access request is completed. In the counting step, a number of transmissions of the access requests received while power supply to the storage portion is stopped for each transmission source of the access requests is counted. In the notification step, a transmission source with a highest count number counted by the counting step among transmission sources of the access requests when the number of times the power supply control is executed exceeds a predetermined reference number of times is notified of.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 3 is a table showing a number of transmissions of a particular access request counted by an image forming apparatus of an embodiment according to the present disclosure.

DETAILED DESCRIPTION

Embodiments according to the present disclosure will be described below with reference to the accompanying drawings. Note that the following embodiments are examples of implementing techniques according to the present disclosure and do not limit the technical scope of the present disclosure.
[Configuration of Image Forming Apparatus 100]

First, a configuration of an image forming apparatus 100 of an embodiment according to the present disclosure will be described with reference to FIG. 1 and FIG. 2. Here, FIG. 1 is a cross-sectional view showing the configuration of the image forming apparatus 100.

The image forming apparatus 100 is a multifunction peripheral having multiple functions such as a scan function, a print function, a facsimile function, and a copy function. The image forming apparatus 100 is an example of an information processing apparatus according to the present disclosure. Note that the technique according to the present disclosure may be applied to information processing apparatuses such as scanners, printers, facsimiles, copiers, personal computers, notebook computers, tablet terminals, and smartphones.

Figure 1:
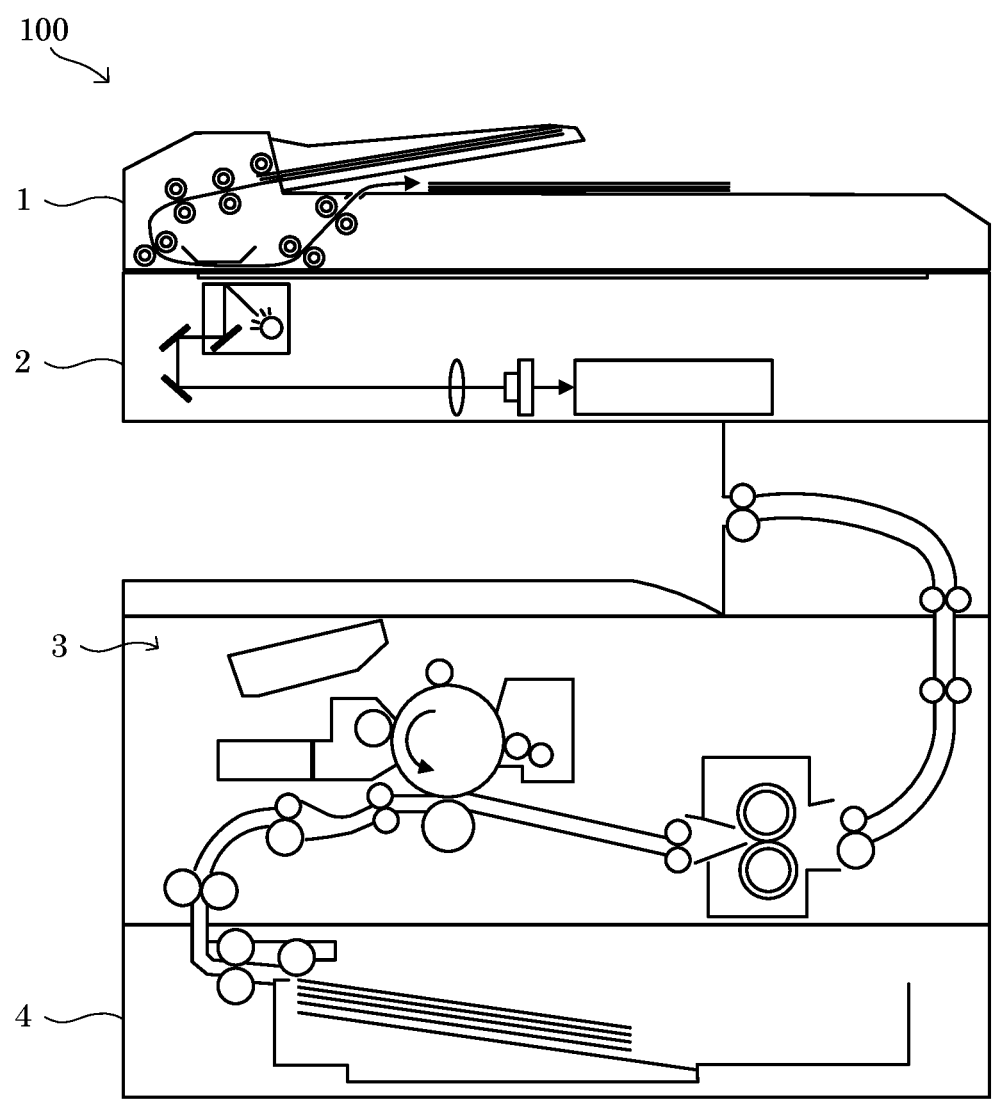
FIG. 1 is a diagram showing a configuration of an image forming apparatus of an embodiment according the present disclosure.
Figure 2:
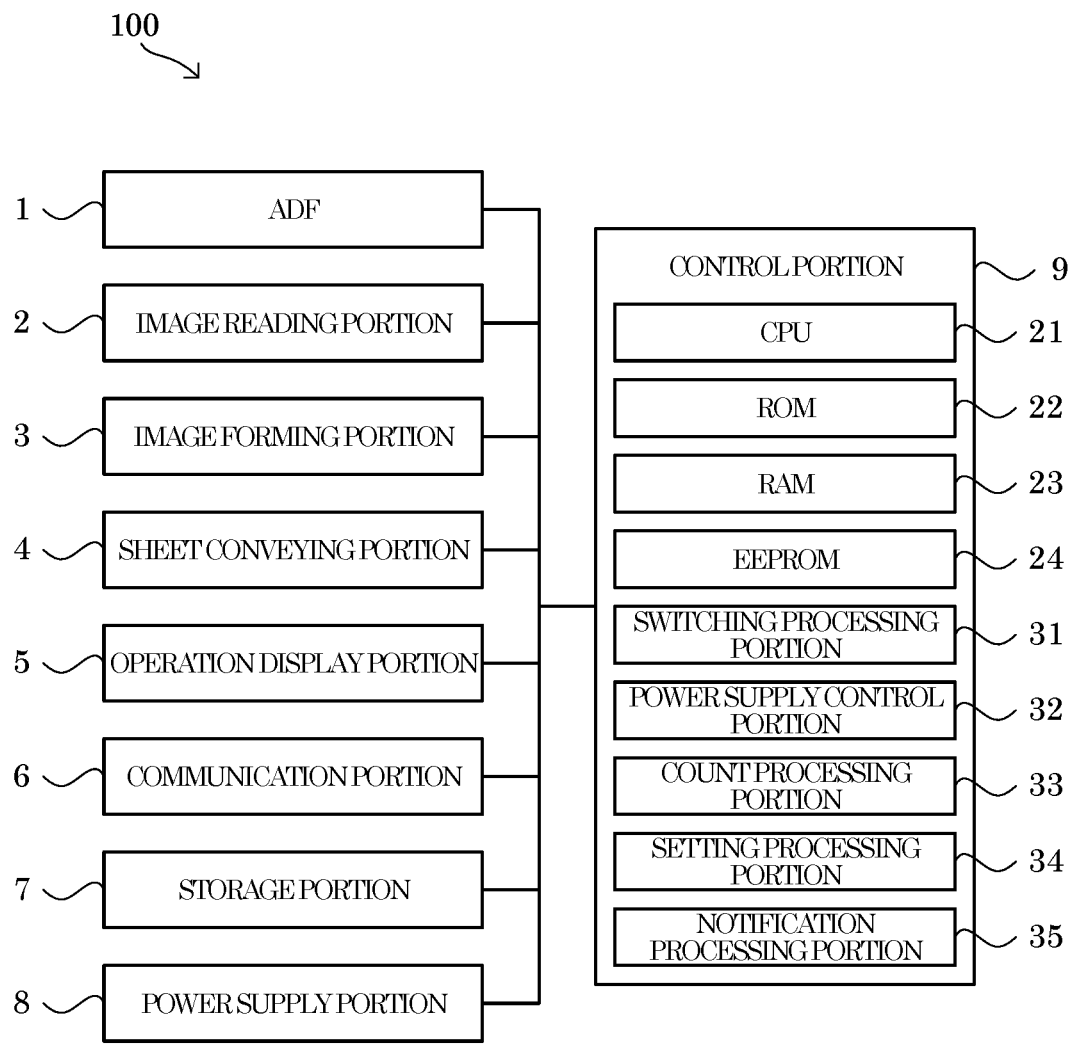
FIG. 2 is a block diagram showing a system configuration of an image forming apparatus of an embodiment according to the present disclosure.

As shown in FIG. 1 and FIG. 2, the image forming apparatus 100 includes an auto document feeder (ADF) 1, an image reading portion 2, an image forming portion 3, a sheet conveying portion 4, an operation display portion 5, a communication portion 6, a storage portion 7, a power supply portion 8, and a control portion 9.

The ADF 1 conveys a document sheet whose image is to be read by the image reading portion 2. The ADF 1 includes a document sheet setting portion, a plurality of conveying rollers, a document sheet holder, and a sheet discharge portion.

The image reading portion 2 reads an image of a document sheet. That is, the image reading portion 2 achieves the scanning function. The image reading portion 2 includes a document sheet table, a light source, a plurality of mirrors, an optical lens, and a charge coupled device (CCD).

The image forming portion 3 forms an image on a sheet based on image data. That is the image forming portion 3 achieves the printing function. More specifically, the image forming portion 3 forms an image by electrophotography. The image forming portion 3 includes a photoconductor drum, a charging device, a laser scanning unit (LSU), a developing device, a transfer device, a cleaning device, and a fixing device.

The sheet conveying portion 4 conveys a sheet on which an image is formed by the image forming portion 3. The sheet conveying portion 4 includes a sheet feed cassette and a plurality of conveying rollers.

The operation display portion 5 is a user interface of the image forming apparatus 100. The operation display portion 5 includes a display portion such as a liquid crystal display for displaying various types of information according to control instructions from the control portion 9, and an operation portion such as operation keys or a touch panel for inputting various types of information to the control portion 9 according to user operation.

The communication portion 6 is a communication interface capable of performing wired or wireless data communication with an external communication device.

Power supply portion 8 supplies power supplied from an external commercial power supply to each portion of the image forming apparatus 100. More specifically, the power supply portion 8 is an AC-DC converter that converts a 100V AC voltage supplied from the commercial power supply into a DC voltage of a predetermined voltage value.

The control portion 9 performs overall control of the image forming apparatus 100. As shown in FIG. 2, the control portion 9 includes a CPU 21, a ROM 22, a RAM 23, and an EEPROM 24. The CPU 21 is a processor that executes various types of arithmetic processing. The ROM 22 is a non-volatile storage device in which information such as a control program for causing the CPU 21 to execute various types of processes is stored in advance. The RAM 23 is a volatile or non-volatile storage device used as a temporary storage memory (work area) for various types of processes executed by the CPU 21. The EEPROM 24 is a non-volatile storage device. In the control portion 9, various types of control programs that are pre-stored in the ROM 22 are executed by the CPU 21. Thus, the control portion 9 performs overall control of the image forming apparatus 100.

The storage portion 7 is a non-volatile storage device. For example, the storage portion 7 is a hard disk drive (HDD). In addition, the storage portion 7 may be a solid state drive (SSD).

The storage portion 7 stores various kinds of data. For example, the storage portion 7 stores system data related to the system of the image forming apparatus 100. The system data includes the model name and serial number of the image forming apparatus 100, firmware version information, information about connected optional devices, and the like. In addition, the storage portion 7 stores address data related to the transmission destination of the image data acquired by the scanning function. Further, the storage portion 7 stores operation history data related to the operation history of the image forming apparatus 100.

Here, an external information processing apparatus communicably connected to the image forming apparatus 100 can access data stored in the storage portion 7. For example, in response to a request from an external information processing apparatus, the control portion 9 causes the display portion of the information processing apparatus to display a web page used for receiving an access request for accessing the storage section 7. In a case where the access request is received on the web page, the control portion 9 executes access processing to access the storage portion 7 according to the access request. More specifically, in the access process, a command is sent to the storage portion 7 to instruct the storage portion 7 to read and write data.

For example, in a case where a reference request for referencing the system data is received on the web page, the control portion 9 reads the system data from the storage portion 7 and causes the display portion of the information processing apparatus that has transmitted the reference request to display the read system data. In addition, in a case where a change request for changing the address data is received on the web page, the control portion 9 rewrites the content of the address data stored in the storage portion 7 based on the change request.

In order to reduce power consumption, an information processing apparatus is known that stops power supply to the storage portion 7 when reading data from or writing data to the storage portion 7 is completed. In this information processing apparatus, the storage portion 7 is activated each time the access request is received.

Here, in the information processing apparatus in which the power supply to the storage portion 7 is stopped after reading data from or writing data to the storage portion 7 is completed, the number of times the storage portion 7 is activated increases accordingly when the access requests increase. In a case where the number of activations of the storage portion 7 is large, the life of the storage portion 7 is correspondingly shortened.

On the other hand, in the image forming apparatus 100 of an embodiment according to the present disclosure, as will be described below, it is possible to suppress an increase in the number of activations of the storage portion 7 caused by access requests from the outside.

More specifically, the ROM 22 of the control portion 9 stores in advance a specific control program for causing the CPU 21 of the control portion 9 to execute power supply control processing (see the flowchart in FIG. 4) and notification processing (see the flowchart in FIG. 5), which will be described later. Note that the specific control program is recorded on a computer-readable recording medium such as a CD, DVD, or flash memory, and may be read from the recording medium and installed in a storage portion such as the EEPROM 24.

The control portion 9, as shown in FIG. 2, includes a switching processing portion 31, a power supply control portion 32, a count processing portion 33, a setting processing portion 34, and a notification processing portion 35. More specifically, the control portion 9 uses the CPU 21 to execute the specific control program stored in the ROM 22. Thus, the control portion 9 functions as the switching processing portion 31, the power supply control portion 32, the count processing portion 33, the setting processing portion 34, and the notification processing portion 35.

Note that some or all of the functional portions included in the control portion 9 may be composed of electronic circuits. In addition, the specific control program may be a program for causing a plurality of processors to function as the functional portions included in the control portion 9.

The switching processing portion 31 switches the operation mode of the image forming apparatus 100 between a normal mode and a power saving mode.

Here, the power saving mode is an operation mode of the image forming apparatus 100 that consumes less power than the normal mode. More specifically, in the power saving mode, power supply to some components of the image forming apparatus 100 is stopped. The storage portion 7 is included among the components for which the power supply is stopped in the power saving mode. That is, the power supply to the storage portion 7 is stopped when the operation mode of the image forming apparatus 100 is switched from the normal mode to the power saving mode.

More specifically, in a case where a predetermined transition condition is satisfied when the operation mode of the image forming apparatus 100 is the normal mode, the switching processing portion 31 switches the operation mode from the normal mode to the power saving mode.

For example, the transition condition includes a first transition condition and a second transition condition. The switching processing portion 31 switches the operation mode of the image forming apparatus 100 to the power saving mode in a case where either the first transition condition or the second transition condition is satisfied. The first transition condition is a condition that a no-operation state in which no operation input is made to the image forming apparatus 100 continues beyond a predetermined time. The second transition condition is a condition that an operation to input an instruction to transition to the power saving mode is performed on the operation display portion 5. Note that the transition condition may include conditions different from the conditions described above.

In addition, in a case where a predetermined return condition is satisfied when the operation mode of the image forming apparatus 100 is the power saving mode, the switching processing portion 31 switches the operation mode from the power saving mode to the normal mode.

For example, the return condition includes a first return condition and a second return condition. The switching processing portion 31 switches the operation mode of the image forming apparatus 100 to the normal mode in a case where either the first return condition or the second return condition is satisfied. The first return condition is a condition that an image forming job transmitted from an external information processing apparatus is received. The second return condition is a condition that the operation display portion 5 is operated. Note that the return condition may include conditions different from the conditions described above.

In a case of switching the operation mode of the image forming apparatus 100 from the normal mode to the power saving mode, the switching processing portion 31 inputs a control signal to the power supply portion 8 to stop the supply of power to some of the components of the image forming apparatus 100. In addition, in a case of switching the operation mode of the image forming apparatus 100 from the power saving mode to the normal mode, the switching processing portion 31 inputs a control signal to the power supply portion 8 to resume supplying power to some of the components of the image forming apparatus 100.

In a case where an access request to access the storage portion 7 is received while the power supply to the storage portion 7 is stopped, the power supply control portion 32 executes power supply control that includes a first step of supplying power to the storage portion 7, and a second step of stopping power supply to the storage portion 7 after the access process of accessing the storage portion 7 in response to the access request is completed.

More specifically, the power supply control portion 32 can execute the power supply control when the operation mode of the image forming apparatus 100 is the power saving mode.

For example, in the first step, the power supply control portion 32 inputs a control signal to the power supply portion 8 to cause the power supply portion 8 to start supplying power to the storage portion 7. In addition, in the second step, the power supply control portion 32 inputs a control signal to the power supply portion 8 to cause the power supply portion 8 to stop supplying power to the storage portion 7. Note that the second step may be executed simultaneously with the end of the access process, or may be executed after a predetermined waiting time has elapsed since the end of the access process.

Note that the power supply control portion 32 may be capable of executing the power supply control regardless of the operation mode of the image forming apparatus 100. In this case, the control portion 9 does not have to include the switching processing portion 31.

The count processing portion 33 counts the number of transmissions of access requests received while power supply to the storage portion 7 is stopped for each transmission source of the access requests.

More specifically, the count processing portion 33 counts the number of transmissions of access requests received while power supply to the storage portion 7 is stopped for each transmission source of the access requests for each specific period that starts periodically.

For example, the specific period is a month-long period that begins with a one-month cycle. That is, the count processing portion 33 counts the number of transmissions of access requests received while power supply to the storage portion 7 is stopped for each transmission source of the access requests during the month, every month. Note that the specific period may be a period of any length that starts at an arbitrary cycle.

For example, in a case where an access request is received while the power supply to the storage portion 7 is stopped, the count processing portion 33 extracts from the access request a MAC address of a communication device that is the transmission source of the access request. Next, the count processing portion 33 determines whether or not the extracted MAC address is stored in advance in a registration storage area provided in the EEPROM 24. Here, in a case where the extracted MAC address is not stored in the registration storage area, the count processing portion 33 determines that the MAC address is unregistered, and stores the MAC address in the registration storage area. In addition, in a case where the count processing portion 33 determines that the extracted MAC address is unregistered, the count processing portion 33 sets a first count value (initial value of zero) corresponding to a combination of the MAC address and current identification information of the specific period in a count storage area provided in the EEPROM 24 in advance, and counts up the first count value. On the other hand, in a case where the extracted MAC address is stored in the registration storage area, the count processing portion 33 determines that the MAC address has been registered, and counts up the first count value corresponding to a combination of the MAC address already set in the count storage area and the identification information of the current specific period. Note that in a case where the current specific period ends and the next specific period starts, the count processing portion 33, for each registered MAC address, sets the first count value (initial value of zero)

corresponding to the combination of the MAC address and the identification information of the next specific period in the count storage area.

In addition, the count processing portion 33 counts the number of times the power supply control is executed during each specific period. For example, in a case where the specific period starts, the count processing portion 33 sets a second count value (initial value of zero) corresponding to identification information of the specific period in the count storage area. The count processing portion 33 counts up the second count value corresponding to the identification information of the current specific period each time the power supply control is executed.

When the number of times the power supply control has been executed exceeds a predetermined reference number of times, the notification processing portion notifies the transmission source with the highest count number counted by the count processing portion 33 among the transmission sources of access requests.

More specifically, for each specific period, the notification processing portion executes determination processing for determining whether or not the number of times the power supply control is executed during the specific period exceeds the reference number of times.

When the execution timing for executing the determination process arrives, the setting processing portion 34 sets the reference number of times based on the remaining product life of the image forming apparatus 100 acquired based on the period of use of the image forming apparatus 100 up to the execution timing, the length of said specified period, and the remaining executable number of times of the power supply control acquired based on a cumulative value of the number of times of execution of the power supply control up to the execution timing.

For example, the image forming apparatus 100 has a product life set in advance. For example, the product life of the image forming apparatus 100 is five years. In addition, in the image forming apparatus 100, product life information indicating the product life of the image forming apparatus 100 is stored in the EEPROM 24 in advance.

The setting processing portion 34 acquires the remaining product life of the image forming apparatus 100 based on the product life information stored in the EEPROM 24, and the elapsed time from the start of use of the image forming apparatus 100 to the present (when the execution timing of the determination process arrives). Note that the elapsed time from the start of use of the image forming apparatus 100 to the present is acquired based on the information indicating the start of use of the image forming apparatus 100 stored in advance in the EEPROM 24 and the current date and time information.

In addition, the number of times the power supply control can be executed is set in advance in the storage portion 7. For example, the number of times the power supply control of the storage portion 7 can be executed is 600,000 times. In addition, in the image forming apparatus 100, executable number information indicating the number of times the power supply control of the storage portion 7 can be executed is stored in the EEPROM 24 in advance.

The setting processing portion 34 acquires the remaining number of times the power supply control can be executed based on executable number information stored in the EEPROM 24, and the cumulative value of the number of executions of the power supply control from the start of use of the image forming apparatus 100 to the present (when the execution timing of the determination process arrives). Note that the cumulative value of the number of executions of the power supply control from the start of use of the image forming apparatus 100 to the present is acquired based on the second count value for each specific period provided in the count storage area.

For example, the setting processing portion 34 calculates the reference number of times according to the following Equation (1). Note that "X" in the following Equation (1) is a symbol indicating the reference number of times. In addition, "A" in the following Equation (1) is a symbol indicating the remaining executable number of times of the power supply control. Moreover, "B" in the following Equation (1) is a symbol indicating the remaining product life of the image forming apparatus 100. Further, "C" in the following Equation (1) is a symbol indicating the length of the specific period.

$$X = A \div (B \div C) \qquad (1)$$

For example, it is presumed that when six months have passed since the start of use of the image forming apparatus 100, the transmission status of access requests corresponding to each registered MAC address and the execution status of the power supply control are as shown in FIG. 3. In this case, the remaining executable number of times of the power supply control is calculated as "600,000 times−26,439 times=573,561 times". In addition, the remaining product life of the image forming apparatus 100 is calculated as "5 years (60 months)−6 months=54 months". Further, the reference number of times is calculated as "573,561 times÷(54 months÷1 month)=times (rounded down after the decimal point)".

Note that the reference number of times may be set based on the product life of the image forming apparatus 100, the length of the specific period, and the number of times the power supply control of the storage portion 7 can be executed. For example, the reference number of times may be calculated as "600,000 times÷(5 years (60 months)÷1 month)=10,000 times". In this case, the setting processing portion 34 may set the reference number of times by the time the execution timing of the determination process arrives for the first time, and does not need to set the reference number of times each time the execution timing arrives.

In a case where it is determined in the determination process that the number of executions of the power supply control in the specific period exceeds the reference number of times, the notification processing portion 35 notifies of the transmission source with the largest number counted by the count processing portion 33 among the transmission sources of the access requests.

More specifically, the notification processing portion 35 notifies of the transmission source having the largest number counted by the count processing portion 33 among transmission sources of the access request, and the vendor of the communication device of the transmission source identified based on the MAC address of the transmission source.

For example, the notification processing portion 35 identifies the vendor of the communication device of the transmission source based on the top three octets of the MAC address of the transmission source with the largest number counted by the count processing portion 33. That is, the notification processing portion 35 identifies the vendor of the communication device having the MAC address based on the vendor code included in the MAC address. For example, the notification processing portion 35, using table data stored in the EEPROM 24 in advance and indicating correspondence between vendor codes and vendor names, identifies the vendor corresponding to the vendor code included in the MAC address. Note that the table data is updated to the latest information when the firmware of the image forming apparatus 100 is updated.

For example, when the notification processing portion 35, through the determination process, determines that the number of executions of the power supply control in the specific period exceeds the reference number of times, the notification processing portion 35 displays a notification message including the MAC address of the transmission source with the largest number counted by the count processing portion 33 among the transmission sources of the access requests, and the vendor of the communication device of the transmission source on a display portion of an external information processing apparatus set beforehand. For example, the above-mentioned notification message is a message having contents such as "The power ON/OFF count of the storage device is frequently occurring because wake-up from sleep due to a request from a device of vendor 'ABC' with MAC address 'oo:oo:oo:\*\*:\*\*:' occurs frequently. If left unchecked, the storage device may fail. Check the device with the corresponding MAC address and check whether the device settings are appropriate. Also, remove the device from the network if not needed." Note that the notification message may also be displayed on the operation display portion 5 of the image forming apparatus 100. In addition, the notification message may include a plurality of transmission sources selected in descending order of the number counted by the count processing portion 33 among the transmission sources of the access requests. Further, the notification message does not need to include the vendor.

Note that, in a case where the cumulative value of the number of times the power supply control is executed since the start of use of the image forming apparatus 100 exceeds a predetermined number of times (another example of the reference number of times of the present disclosure), such as 10,000 times, the notification processing portion 35 may notify of the transmission source with the largest number counted by the count processing portion 33 among the transmission sources of the access requests. In this case, the control portion 9 does not have to include the setting processing portion 34.

[Power Supply Control Process]

Figure 4:
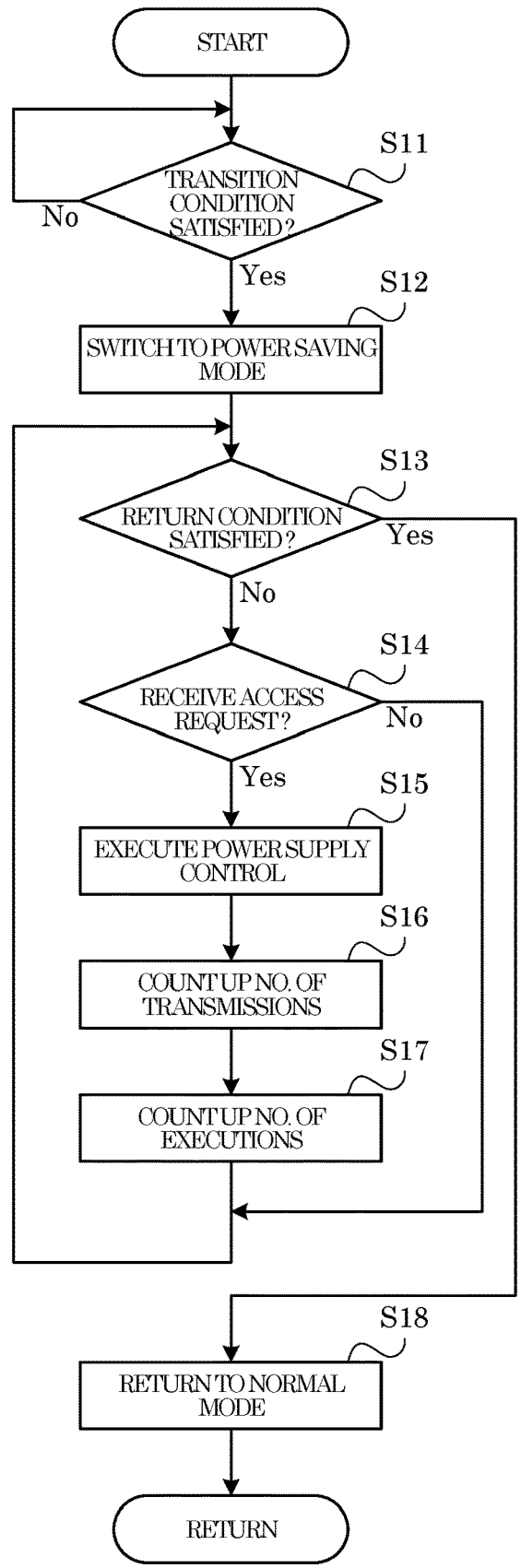
FIG. 4 is a flowchart illustrating an example of power supply control processing executed by an image forming apparatus of an embodiment according to the present disclosure.

Hereinafter, a part of the notification method according to the present disclosure, along with an example of the power supply control processing procedure executed by the control portion 9 in the image forming apparatus 100, will be described with reference to FIG. 4. Here, steps S11, S12 and so on represent the numbers of processing procedures (steps) executed by the control portion 9.

<Step S11>

First, in step S11, the control portion 9 determines whether or not the transition condition is satisfied.

Here, when the control portion 9 determines that the transition condition is satisfied (YES side of S11), the control portion 9 causes the process to proceed to step S12. In addition, when the transition condition is not satisfied (NO side of S11), the control portion 9 waits for the transition condition to be satisfied in step S11.

<Step S12>

In step S12, the control portion 9 switches the operation mode of the image forming apparatus 100 from the normal mode to the power saving mode. Here, the processing of step S12 is executed by the switching processing portion 31 of the control portion 9.

More specifically, the control portion 9 inputs a control signal to the power supply portion 8 to stop power supply to some of the components of the image forming apparatus 100.

<Step S13>

In step S13, the control portion 9 determines whether or not the return condition is satisfied.

Here, when the control portion 9 determines that the return condition is satisfied (YES side of S13), the control portion 9 causes the process to proceed to step S18. In addition, when the return condition is not satisfied (NO side of S13), the control portion 9 causes the process to proceed to step S14.

<Step S14>

In step S14, the control portion 9 determines whether or not the access request has been received.

Here, when the control portion 9 determines that the access request has been received (YES side in S14), the control portion 9 causes the process to proceed to step S15. In addition, when the access request has not been received (NO side in S14), the control portion 9 causes the process to proceed to step S13.

<Step S15>

In step S15, the control portion 9 executes the power supply control including the first step and the second step. Here, the process of step S15 is an example of the power supply control step according to the present disclosure, and is executed by the power supply control portion 32 of the control portion 9.

More specifically, in the first step, the control portion 9 inputs a control signal to the power supply portion 8 to cause the power supply portion 8 to start supplying power to the storage portion 7. In addition, in the second step, the control portion 9 inputs a control signal to the power supply portion 8 to cause the power supply portion 8 to stop supplying power to the storage portion 7.

<Step S16>

In step S16, the control portion 9 counts up the number of transmissions of the access requests corresponding to the transmission source of the access request determined to be received in step S14. Here, the processing of step S16 is an example of the counting step according to the present disclosure, and is executed by the count processing portion 33 of the control portion 9.

More specifically, the control portion 9 extracts the MAC address of the communication device of the transmission source that transmitted the access request from the access request determined to have been received in step S14. Next, the control portion 9 determines whether or not the extracted MAC address is stored in the registration storage area. Here, in a case where the extracted MAC address is not stored in the registration storage area, the control portion 9 determines that the MAC address is unregistered, and stores the MAC address in the registration storage area. In addition, in a case where the control portion 9 determines that the extracted MAC address is unregistered, the control portion 9 sets the first count value (initial value of zero) corresponding to a combination of the MAC address and current identification information of the specific period in the count storage area, and counts up the first count value. On the other hand, in a case where the extracted MAC address is stored in the registration storage area, the control portion 9 determines that the MAC address has been registered, and counts up the first count value corresponding to a combination of the MAC address already set in the count storage area and the identification information of the current specific period.

<Step S17>

In step S17, the control portion 9 counts up the number of times the power supply control has been executed. Here, the processing of step S17 is executed by the count processing portion 33 of the control portion 9.

More specifically, the control portion 9 counts up the second count value corresponding to the identification information of the current specific period in the counting storage area.

<Step S18>

In step S18, the control portion 9 returns the operation mode of the image forming apparatus 100 from the power saving mode to the normal mode. Here, the processing of step S18 is executed by the switching processing portion 31 of the control portion 9.

More specifically, the control portion 9 inputs a control signal to the power supply portion 8 to restart power supply to some of the components of the image forming apparatus 100.

[Notification Process]

Figure 5:
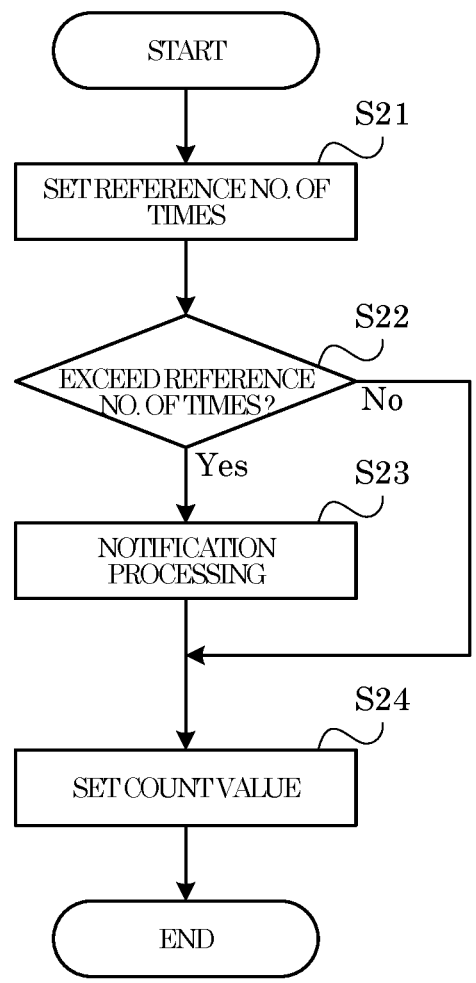
FIG. 5 is a flowchart illustrating an example of notification processing executed by an image forming apparatus of an embodiment according to the present disclosure.

Next, with reference to FIG. 5, an example of the procedure of the notification process executed by the control portion 9 in the image forming apparatus 100 and the remaining part of the notification method according to the present disclosure will be described. For example, the notification process is executed at timing when the specific period ends.

<Step S21>

First, in step S21, the control portion 9 sets the reference number of times. Here, the processing of step S21 is executed by the setting processing portion 34 of the control portion 9.

More specifically, the control portion 9 acquires the remaining product life of the image forming apparatus 100 based on the product life information stored in the EEPROM 24 and the elapsed time from the start of use of the image forming apparatus 100 to the present. In addition, the control portion 9 acquires the remaining executable number of times of the power supply control based on the information of the executable number of times stored in the EEPROM 24 and the cumulative value of the number of times the power supply control has been performed since the start of use of the image forming apparatus 100 to the present. In addition, the control portion 9 substitutes the acquired remaining product life of the image forming apparatus 100 and the remaining executable number of times of power supply control into the Equation (1) above to calculate the reference number of times.

Thus, compared to a configuration in which the reference number of times is determined without being based on the product life of the image forming apparatus 100 and the number of times the power supply control of the storage portion 7 can be executed, it is possible to issue the notification message only when there is a risk that the storage portion 7 will fail before the product life of the image forming apparatus 100 expires. In addition, in comparison with a configuration in which the reference number of times is set based on the product life of the image forming apparatus 100, the length of the specific period, and the number of times the power supply control of the storage portion 7 can be executed, it is possible to set the reference number of times more flexibly by considering the execution status of the power supply control up to the present.

<Step S22>

In step S22, the control portion 9 executes the determination process of determining whether or not the number of executions of the power supply control in the specific period that has ended exceeds the reference number of times set in step S21.

Here, when the control portion 9 determines in the determination process that the number of times the power supply control has been executed exceeds the reference number of times (YES side in S22), the control portion 9 causes the process to proceed to step S23. In addition, when the control portion 9 determines in the determination process that the number of times the power supply control has been executed is equal to or less than the reference number of times (NO side in S22), the control portion 9 causes the process to proceed to step S24.

<Step S23>

In step S23, the control portion 9 notifies of the transmission source with the largest first count value corresponding to the specific period that has ended. Here, the processing of steps S22 and S23 is an example of the notification step according to the present disclosure, and is executed by the notification processing portion 35 of the control portion 9.

More specifically, the control portion 9, based on the top three octets of the MAC address with the highest first count value corresponding to the specific period that has ended, identifies the vendor of the communication device of the transmission source corresponding to the MAC address. In addition, the control portion 9 causes the display portion of a predetermined external information processing apparatus to display the notification message including the specified vendor.

Thus, the user notified of the notification message can perform work of persuading the user corresponding to the transmission source that has transmitted access requests the largest number of times to refrain from transmitting the access requests. In addition, by including the vendor of the communication device of the transmission source in the notification message, it becomes easy for the user notified of the notification message to identify the communication device.

<Step S24>

In step S24, the control portion 9 sets the first count value and the second count value corresponding to the next specific period. Here, the processing of step S24 is executed by the count processing portion 33 of the control portion 9.

More specifically, for each MAC address that has already been registered, the control portion 9 sets the first count value (initial value of zero) corresponding to the combination of the MAC address and the identification information of the next specific period in the count storage area. In addition, the control portion 9 sets the second count value (initial value of zero) corresponding to the identification information of the next specific period in the count storage area.

In this way, in the image forming apparatus 100, the number of transmissions of the access requests received while power supply to the storage portion 7 is stopped is counted for each transmission source of the access requests. In the image forming apparatus 100, when the number of times the power supply control is executed exceeds the reference number of times, notification of the transmission source having the largest count number among the transmission sources of the access requests is performed. Thus, the user notified of the transmission source is able to persuade the user corresponding to the transmission source to refrain from transmitting the access request. Therefore, it is possible to suppress an increase in the number of activations of the storage portion 7 due to the access requests from the outside.

[Supplementary Notes]

An outline of the disclosure extracted from the above-described embodiments will be added below. Note that each configuration and each processing function described in the supplementary notes below can be selected and combined arbitrarily.

<Supplementary Note 1>

An information processing apparatus including: a power supply control portion configured to execute power supply control that includes: a first step of supplying power to a non-volatile storage portion in a case where an access request to access the storage portion is received while power supply to the storage portion is stopped; and a second step of stopping power supply to the storage portion after an access process of accessing the storage portion in response to the access request is completed; a count processing portion configured to count a number of transmissions of the access requests received while power supply to the storage portion is stopped for each transmission source of the access requests; and a notification processing portion configured to notify of a transmission source with a highest count number counted by the count processing portion among transmission sources of the access requests when a number of times the power supply control is executed exceeds a predetermined reference number of times.

<Supplementary Note 2>

The information processing apparatus according to supplementary note 1, wherein the count processing portion counts the number of transmissions of the access requests received while power supply to the storage portion is stopped for each transmission source of the access requests, for each specific period that is started periodically; and the notification processing portion executes a determination process for determining whether or not the number of times the power supply control is executed in the specific period exceeds the reference number of times for each specific period, and in a case where it is determined in the determination process that the number of executions of the power supply control in the specific period exceeds the reference number of times, notifies of the transmission source with the largest count number counted by the count processing portion among the transmission sources of the access requests.

<Supplementary Note 3>

The information processing apparatus according to supplementary note 2, further including in a case where an execution timing of the determination process arrives, a setting processing portion configured to set the reference number of times based on a remaining product life of the information processing apparatus that is acquired based on a period of use of the information processing apparatus up to the execution timing, a length of the specific period, and a remaining executable number of times of the power supply control acquired based on a cumulative value of a number of times of execution of the power supply control up to the execution timing.

<Supplementary Note 4>

The information processing apparatus according to any one of supplementary notes 1 to 3, wherein the notification processing portion notifies of a vendor of a communication device of a transmission source identified based on a MAC address of the transmission source with the highest count counted by the count processing portion among the transmission sources of the access requests.

<Supplementary Note 5>

The information processing apparatus according to any one of supplementary notes 1 to 4, including a switching processing portion configured to switch an operation mode of the information processing apparatus between a normal mode and a power saving mode that consumes less power than the normal mode; wherein power supply to the storage portion is stopped in a case where the operation mode is switched from the normal mode to the power saving mode; and the power supply control portion is able to execute the power supply control in a case where the operation mode is the power saving mode.

<Supplementary Note 6>

The information processing apparatus according to any one of supplementary notes 1 to 5, including one or both of an image reading portion configured to read an image of a document sheet and an image forming portion configured to form an image based on image data.

<Supplementary Note 7>

A notification method including: a power supply control step of executing power supply control including a first step of supplying power to a non-volatile storage portion in a case where an access request to access the storage portion is received while power supply to the storage portion is stopped; and a second step of stopping power supply to the storage portion after an access process of accessing the storage portion in response to the access request is completed; a counting step of counting a number of transmissions of the access requests received while power supply to the storage portion is stopped for each transmission source of the access requests; and a notification step of notifying of a transmission source with a highest count number counted by the counting step among transmission sources of the access requests when the number of times the power supply control is executed exceeds a predetermined reference number of times.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An information processing apparatus comprising a processor configured to function as:
   a power supply control portion configured to execute power supply control to:
      supply power to a non-volatile storage portion in a case where an access request transmitted from an other information processing apparatus of one or more other information processing apparatuses to access the storage portion is received while power supply to the storage portion is stopped; and
      stop power supply to the storage portion after an access process of accessing the storage portion in response to the access request is completed;
   a count processing portion configured to count a number of transmissions of access requests received while power supply to the storage portion is stopped for each of the one or more other information processing apparatuses which are transmission sources of the access requests; and
   a notification processing portion configured to notify of a transmission source with a highest count number counted by the count processing portion among transmission sources of the access requests when a number of times the power supply control is executed exceeds a predetermined reference number of times.

2. The information processing apparatus according to claim 1, wherein
   the count processing portion counts the number of transmissions of the access requests received while power supply to the storage portion is stopped for each transmission source of the access requests, for each specific period that is started periodically; and the notification processing portion executes a determination process for determining whether or not the number of times the power supply control is executed in the specific period exceeds the reference number of times for each specific period, and in a case where it is determined in the determination process that the number of executions of the power supply control in the specific period exceeds the reference number of times, notifies of the transmission source with the largest count number counted by the count processing portion among the transmission sources of the access requests.

3. The information processing apparatus according to claim 2, wherein the processor is further configured to function as:

in a case where an execution timing of the determination process arrives, a setting processing portion configured to set the reference number of times based on a remaining product life of the information processing apparatus that is acquired based on a period of use of the information processing apparatus up to the execution timing, a length of the specific period, and a remaining executable number of times of the power supply control acquired based on a cumulative value of a number of times of execution of the power supply control up to the execution timing.

4. The information processing apparatus according to claim 1, wherein the notification processing portion notifies of a vendor of a communication device of a transmission source identified based on a MAC address of the transmission source with the highest count counted by the count processing portion among the transmission sources of the access requests.

5. The information processing apparatus according to claim 1, wherein the processor is further configured to function as:

a switching processing portion configured to switch an operation mode of the information processing apparatus between a normal mode and a power saving mode that consumes less power than the normal mode; wherein power supply to the storage portion is stopped in a case where the operation mode is switched from the normal mode to the power saving mode; and the power supply control portion is able to execute the power supply control in a case where the operation mode is the power saving mode.

6. The information processing apparatus according to claim 1, comprising one or both of an image reading portion configured to read an image of a document sheet and an image forming portion configured to form an image based on image data.

7. A notification method comprising:

executing power supply control by supplying power to a non-volatile storage portion in a case where an access request transmitted from an other information processing apparatus of one or more other information processing apparatuses to access the storage portion is received while power supply to the storage portion is stopped; and stopping power supply to the storage portion after an access process of accessing the storage portion in response to the access request is completed;

counting a number of transmissions of access requests received while power supply to the storage portion is stopped for each of the one or more other information processing apparatuses which are transmission sources of the access requests; and notifying of a transmission source with a highest count number counted among transmission sources of the access requests when the number of times the power supply control is executed exceeds a predetermined reference number of times.

* * * * *